US012517460B2

(12) United States Patent
Yamasaki et al.

(10) Patent No.: US 12,517,460 B2
(45) Date of Patent: Jan. 6, 2026

(54) DEVELOPING DEVICE AND IMAGE FORMING APPARATUS

(71) Applicant: FUJIFILM Business Innovation Corp., Tokyo (JP)

(72) Inventors: Shunsuke Yamasaki, Kanagawa (JP); Koji Yoshitsugu, Kanagawa (JP); Yuta Shimatate, Kanagawa (JP); Yasuhisa Gonda, Kanagawa (JP); Kazunari Ishii, Kanagawa (JP); Yuka Nomura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 424 days.

(21) Appl. No.: 18/154,423

(22) Filed: Jan. 13, 2023

(65) Prior Publication Data

US 2024/0094673 A1 Mar. 21, 2024

(30) Foreign Application Priority Data

Sep. 15, 2022 (JP) ................................ 2022-146813

(51) Int. Cl.
*G03G 21/20* (2006.01)
*G03G 15/08* (2006.01)

(52) U.S. Cl.
CPC ....... *G03G 21/206* (2013.01); *G03G 15/0865* (2013.01)

(58) Field of Classification Search
CPC ............. G03G 21/206; G03G 15/0865; G03G 15/0898
See application file for complete search history.

(56) References Cited

U.S. PATENT DOCUMENTS 4,361,396 A * 11/1982 Uchida ............. G03G 15/0898 399/104
2008/0170876 A1* 7/2008 Sakai .................. G03G 21/206 399/93
2020/0272072 A1* 8/2020 Morimoto ............ G03G 21/206

FOREIGN PATENT DOCUMENTS

JP 2011-007920 A 1/2011

* cited by examiner

*Primary Examiner* — Sandra Brase
(74) *Attorney, Agent, or Firm* — Oliff PLC

(57) ABSTRACT

A developing device includes: a container that contains developer; a developer holder that rotates with the developer being held on a surface thereof to transport the developer to a developing region; and a cooling unit. An introduction port is provided at a position corresponding to the developing region, the introduction port allowing suction of a floating substance generated in the developing region in a transverse direction of the container. The cooling unit is connected to the introduction port to allow passage of gas containing the floating substance in a longitudinal direction of the container, and cools the container with the gas. An intake port is connected to an end of the cooling unit in the longitudinal direction, the intake port allowing introduction of gas.

12 Claims, 5 Drawing Sheets

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2022-146813 filed Sep. 15, 2022.

BACKGROUND

(i) Technical Field

The present disclosure relates to a developing device and an image forming apparatus.

(ii) Related Art

Japanese Unexamined Patent Application Publication No. 2011-007920 ([0012]-[0016], [0029]-[0034], FIGS. 1-2, and FIG. 5), hereinafter referred to as Patent Document 1, describes a technology for collection of developer floating between a developing device and a photoconductor in an image forming apparatus.

According to the technology described in Patent Document 1, a suction device (5) is disposed below a developing device (4), and a substance to be collected is sucked through an introduction opening (52a) of a suction passage (52) and collected with a collection filter. According to Patent Document 1, a second opening (55) is formed near the introduction opening (52a) to allow introduction of air into the suction passage (52) to increase a suction flow velocity.

SUMMARY

Aspects of non-limiting embodiments of the present disclosure relate to an increase in the efficiency of cooling a developing device compared to when the developing device is cooled with air sucked only through an introduction port for a floating substance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a developing device including: a container that contains developer; a developer holder that rotates with the developer being held on a surface thereof to transport the developer to a developing region; and a cooling unit, wherein an introduction port is provided at a position corresponding to the developing region, the introduction port allowing suction of a floating substance generated in the developing region in a transverse direction of the container, wherein the cooling unit is connected to the introduction port to allow passage of gas containing the floating substance in a longitudinal direction of the container, and cools the container with the gas, and wherein an intake port is connected to an end of the cooling unit in the longitudinal direction, the intake port allowing introduction of gas.

BRIEF DESCRIPTION OF THE DRAWINGS

An exemplary embodiment of the present disclosure will be described in detail based on the following figures, wherein.

DETAILED DESCRIPTION

Figure 1:
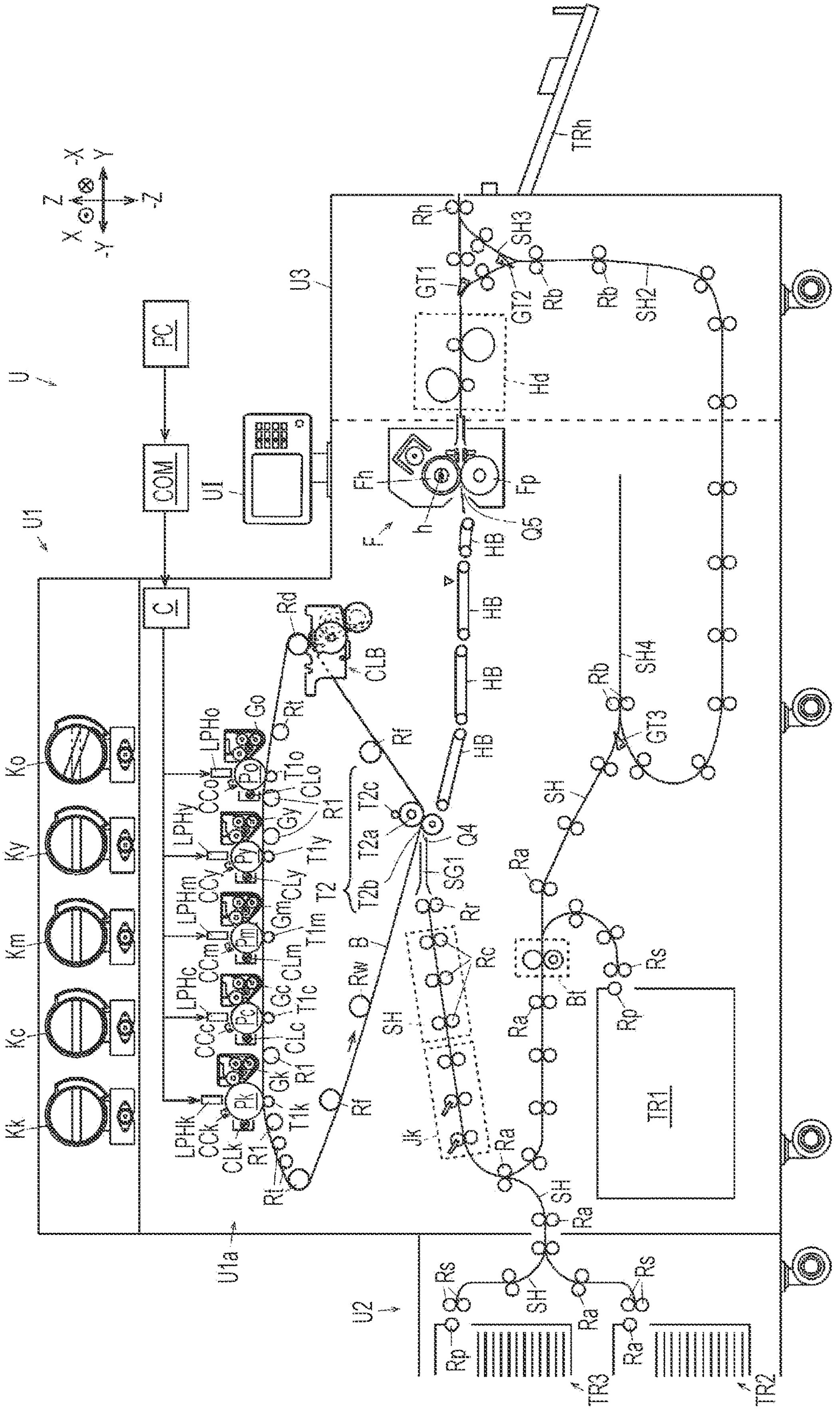
FIG. 1 illustrates the overall structure of an image forming apparatus according to an exemplary embodiment.

While an exemplary embodiment of the present disclosure will be described with reference to the drawings, the present disclosure is not limited to the exemplary embodiment described below.

To facilitate understanding of the following description, in each figure, the front-back direction (medium width direction), the left-right direction (medium transporting direction), and the up-down direction are defined as the X-axis direction, the Y-axis direction, and the Z-axis direction, respectively. In addition, the directions shown by arrows X, −X, Y, −Y, Z, and −Z are defined as forward, backward, rightward, leftward, upward, and downward, respectively, and sides in those directions are defined as the front side, the back side, the right side, the left side, the top side, and the bottom side, respectively.

In addition, in each figure, a circle with a dot in the middle represents an arrow coming out of the page, and a circle with an X in the middle represents an arrow going into the page.

In the drawings, components other than those to be described with reference to the drawings are omitted as appropriate to facilitate understanding.

Exemplary Embodiment

Description of Overall Structure of Printer U of Exemplary Embodiment

FIG. 1 illustrates the overall structure of an image forming apparatus according to an exemplary embodiment.

Referring to FIG. 1, a printer U, which is an example of an image forming apparatus according to the exemplary embodiment of the present disclosure, includes a printer body U1; a feeder unit U2, which is an example of a supply device that supplies a medium to the printer body U1; an operation unit UI operated by a user; and a finisher U3, which is an example of a post-processing device that performs post-processing on the medium output from the printer body U1.

Description of Marking Structure of Exemplary Embodiment

Referring to FIG. 1, the printer body U1 includes a controller (example of a control unit) C that controls the printer U; a communication unit (not illustrated) that receives image information transmitted from a print image server COM, which is an example of an information transmission device connected to a unit outside the printer U by a dedicated cable (not illustrated); and a marking unit U1*a*, which is an example of a recording unit that records an image on the medium. The print image server COM is connected by a cable or a network, such as a local area network (LAN), to a personal computer PC, which is an example of an image transmission device that transmits information of an image to be printed by the printer U.

The marking unit U1*a* includes photoconductors Py, Pm, Pc, and Pk, which are examples of image carriers for respective colors, which are yellow (Y), magenta (M), cyan (C), and black (K), and a photoconductor Po used to make an image glossy when, for example, a photographic image is printed. The photoconductors Py to Po are each made of a dielectric having a photosensitive surface.

Referring to FIG. 1, a charging device CCk, an exposure device LPHk, a developing device Gk, a first transfer roller T1*k*, and a photoconductor cleaner CLk, which are examples of a charging unit, a latent-image forming unit, a developing unit, a first transfer unit, and an image-carrier cleaning unit, respectively, are arranged around the black photoconductor Pk in that order in a direction in which the photoconductor Pk rotates.

Similarly, charging devices CCy, CCm, CCc, and CCo, exposure devices LPHy, LPHm, LPHc, and LPHo, developing devices Gy, Gm, Gc, and Go, first transfer rollers T1*y*, T1*m*, T1*c*, and T1*o*, and photoconductor cleaners CLy, CLm, CLc, and CLo are disposed around the other photoconductors Py, Pm, Pc, and Po.

Toner cartridges Ky, Km, Kc, Kk, and Ko, which are examples of containers for developers, are removably supported above the marking unit U1*a*. Developers to be supplied to the developing devices Gy to Go are contained in the toner cartridges Ky to Ko.

An intermediate transfer belt B, which is an example of an intermediate transfer unit and which is also an example of an image carrier, is disposed below the photoconductors Py to Po. The intermediate transfer belt B is disposed between each of the photoconductors Py to Po and a corresponding one of the first transfer rollers T1*y* to T1*o*. The inner surface of the intermediate transfer belt B is supported by a driving roller Rd, which is an example of a driving unit; a tension roller Rt, which is an example of a tension-applying unit; a walking roller Rw, which is an example of a meandering prevention unit; plural idler rollers Rf, which are examples of driven units; a backup roller T2*a*, which is an example a second-transfer facing unit; plural retractable rollers R1, which are examples of movable units; and the first transfer rollers T1*y* to T1*o*.

A belt cleaner CLB, which is an example of an intermediate-transfer-unit cleaning unit, is disposed on the outer surface of the intermediate transfer belt B at a position close to the driving roller Rd.

A second transfer roller T2*b*, which is an example of a second transfer member, faces the backup roller T2*a* with the intermediate transfer belt B disposed therebetween. A contact roller T2*c*, which is an example of a contact unit, is in contact with the backup roller T2*a* to apply a voltage of the same polarity as the charging polarity of the developers to the backup roller T2*a*.

The backup roller T2*a*, the second transfer roller T2*b*, and the contact roller T2*c* constitute a second transfer device T2, which is an example of a second transfer unit according to the exemplary embodiment. The first transfer rollers T1*y* to T1*o*, the intermediate transfer belt B, the second transfer device T2, and other components constitute a transfer apparatus T1, B, T2, which is an example of a transfer unit according to the exemplary embodiment.

A paper feed tray TR1, which is an example of a container, is provided below the second transfer device T2. Recording sheets S, which are examples of media, are stored in the paper feed tray TR1. A pick-up roller Rp, which is an example of a pick-up unit, and separation rollers Rs, which are examples of separation units, are disposed in an upper right region of the paper feed tray TR1. A transport path SH, along which the recording sheets S are transported, extends from the separation rollers Rs. Plural transport rollers Ra, which are examples of transport units that transport the recording sheets S downstream, are arranged along the transport path SH.

A deburring device Bt, which is an example of an unnecessary-portion-removing unit, is disposed downstream of the separation rollers Rs. The deburring device Bt performs deburring, which is a process of removing unnecessary portions at the edges of each recording sheet S by transporting the recording sheet S downstream while nipping the recording sheet S at a preset pressure.

A double-feeding detection device Jk is disposed downstream of the deburring device Bt. The double-feeding detection device Jk measures the thickness of the recording sheets S that pass therethrough to detect double feeding, which is a state in which multiple recording sheets S are transported in an overlapping state.

Correction rollers Rc, which are examples of position correction units, are disposed downstream of the double-feeding detection device Jk. The correction rollers Rc correct a skew, that is, an inclination of each recording sheet S with respect to the transporting direction.

Registration rollers Rr, which are examples of adjustment units that adjust the time at which each recording sheet S is transported to the second transfer device T2, are disposed downstream of the correction rollers Rc. A sheet guide SG1, which is an example of a medium guide unit, is disposed downstream of the registration rollers Rr.

The feeder unit U2 also includes paper feed trays TR2 and TR3 and other components that are structured similarly to the paper feed tray TR1, the pick-up roller Rp, the separation rollers Rs, and the transport rollers Ra, and a transport path SH that extends from the paper feed trays TR2 and TR3 joins the transport path SH in the printer body U1 at a position upstream of the double-feeding detection device Jk.

Plural transport belts HB, which are examples of medium transport units, are disposed downstream of the second transfer roller T2*b* in the transporting direction of the recording sheet S.

A fixing device F, which is an example of a fixing unit, is disposed downstream of the transport belts HB in the transporting direction of the recording sheet S.

A decurler Hd, which is an example of a curvature-reducing unit, is disposed in the finisher U3, which is located downstream of the fixing device F. The decurler Hd reduces the curvature, or curl, of the recording sheet S by applying a pressure to the recording sheet S.

A transport path SH that extends toward an output tray TRh, which is an example of a stacking unit, is provided downstream of the decurler Hd. Output rollers Rh, which are examples of output units, are disposed at the downstream end of the transport path SH.

A reversing path SH2, which is an example of a transport path that branches from the transport path SH, is provided downstream of the decurler Hd. A first gate GT1, which is an example of a transporting-direction-switching unit, is disposed at the branching point at which the reversing path SH2 branches from the transport path SH.

The reversing path SH2 has plural switchback rollers Rb, which are examples of transport units that are rotatable in forward and reverse directions. A connection path SH3 is provided upstream of the switchback rollers Rb as an example of a transport path that branches from an upstream portion of the reversing path SH2 and joins the transport path SH at a position downstream of the branching point at which the reversing path SH2 branches from the transport path SH. A second gate GT2, which is an example of a transporting-direction-switching unit, is disposed at the branching point at which the connection path SH3 branches from the reversing path SH2.

A switchback path SH4, which is disposed downstream of the reversing path SH2 and below the fixing device F, is used to reverse the transporting direction of the recording sheet S, that is, to transport the recording sheet S in a switchback manner. The switchback path SH4 has switchback rollers Rb, which are examples of transport units that are rotatable in forward and reverse directions. In addition, a third gate GT3, which is an example of a transporting-direction-switching unit, is disposed is at the entrance of the switchback path SH4.

A transport path SH disposed downstream of the switchback path SH4 joins the transport path SH that extends from the paper feed tray TR1.

Marking Operation

The printer U starts a job, which is an image forming operation, when the printer U receives image information transmitted from the personal computer PC through the print image server COM. When the job is started, the photoconductors Py to Po, the intermediate transfer belt B, and other components rotate.

The photoconductors Py to Po are driven by a drive source (not illustrated).

The charging devices CCy to CCo receive a preset voltage and charge the surfaces of the respective photoconductors Py to Po.

The exposure devices LPHy to LPHo, which are examples of latent-image forming units and which are also examples of light-emitting devices, respectively output laser beams Ly, Lm, Lc, Lk, and Lo for writing latent images in accordance with control signals from the controller C, thereby writing electrostatic latent images on the charged surfaces of the photoconductors Py to Po.

The developing devices Gy to Go develop the electrostatic latent images on the surfaces of the respective photoconductors Py to Po.

The toner cartridges Ky to Ko supply the developers to the respective developing devices Gy to Go, which consume the developers in the developing process.

The first transfer rollers T1*y* to T1*o* receive a first transfer voltage having a polarity opposite to the charging polarity of the developers, so that the visible images on the surfaces of the photoconductors Py to Po are transferred onto the intermediate transfer belt B.

The photoconductor cleaners CLy to CLo clean the surfaces of the respective photoconductors Py to Po by removing the developers that remain on the surfaces of the photoconductors Py to Po after the first transfer process.

The intermediate transfer belt B causes O, Y, M, C, and K images to be transferred thereto in that order when the intermediate transfer belt B passes through first transfer regions in which the intermediate transfer belt B faces the photoconductors Py to Po, and then passes through a second transfer region Q4 in which the intermediate transfer belt B faces the second transfer device T2. When a monochrome image is to be formed, an image of a single color is transferred onto the intermediate transfer belt B and transported toward the second transfer region Q4.

The recording sheets S are fed from one of the paper feed trays TR1 to TR3 by the corresponding pick-up roller Rp in accordance with, for example, the size of the received image information, designation of the recording sheets S, and the sizes and types of the recording sheets S that are stored.

The separation rollers Rs separate the recording sheets S fed by the pick-up roller Rp from each other.

The deburring device Bt applies a preset pressure to each recording sheet S that passes therethrough to deburr the recording sheet S.

The double-feeding detection device Jk detects the thickness of the recording sheets S that pass therethrough to detect double feeding of the recording sheets S.

The correction rollers Rc correct a skew of each recording sheet S that passes therethrough by bringing the recording sheet S into contact with a wall surface (not illustrated).

The registration rollers Rr feed the recording sheet S at a time corresponding to the time at which the images on the surface of the intermediate transfer belt B reach the second transfer region Q4.

The sheet guide SG1 guides the recording sheet S fed by the registration rollers Rr to the second transfer region Q4.

The backup roller T2*a* of the second transfer device T2 receives a preset second transfer voltage having the same polarity as the charging polarity of the developers through the contact roller T2*c*, so that the images on the intermediate transfer belt B are transferred onto the recording sheet S.

The belt cleaner CLB cleans the intermediate transfer belt B by removing the developers that remain on the surface of the intermediate transfer belt B after the images are transferred in the second transfer region Q4.

The transport belts HB hold the recording sheet S to which the images have been transferred by the second transfer device T2 on the surfaces thereof, and transport the recording sheet S downstream.

The fixing device F includes a heating roller Fh, which is an example of a heating member, and a pressing roller Fp, which is an example of a pressing member. A heater h, which is an example of a heat source, is disposed in the heating roller Fh. The fixing device F heats the recording sheet S that passes through a fixing region Q5, in which the heating roller Fh and the pressing roller Fp are in contact with each other, while pressing the recording sheet S, thereby fixing the unfixed images on the surface of the recording sheet S to the recording sheet S. The heating roller Fh and the pressing roller Fp constitute a fixing member Fp, Fh according to the exemplary embodiment.

The decurler Hd applies a pressure to the recording sheet S that has passed through the fixing device F to remove the curvature, or curl, of the recording sheet S.

When the recording sheet S that has passed through the decurler Hd is to be subjected to double-sided printing, the first gate GT1 is activated so that the recording sheet S is transported to the reversing path SH2, transported in a switchback manner along the switchback path SH4, and fed to the registration rollers Rr again along the transport path SH, and printing is performed on a second surface of the recording sheet S.

When the recording sheet S is to be output onto the output tray TRh face-up, that is, such that the surface on which an image is recorded faces upward, the recording sheet S is transported along the transport path SH and output onto the output tray TRh by the output rollers Rh.

When the recording sheet S is to be output face-down, that is, such that the surface on which the image is recorded faces downward, the recording sheet S is temporarily transported from the transport path SH to the reversing path SH2. After the trailing end of the recording sheet S in the transporting direction has passed the second gate GT2, forward rotation of the switchback rollers Rb is stopped. Then, the second gate GT2 is switched and the switchback rollers Rb are rotated in the reverse direction so that the recording sheet S is transported to the output tray TRh along the connection path SH3.

The output recording sheet S is placed on the output tray TRh.

Description of Developing Device

Figure 2:
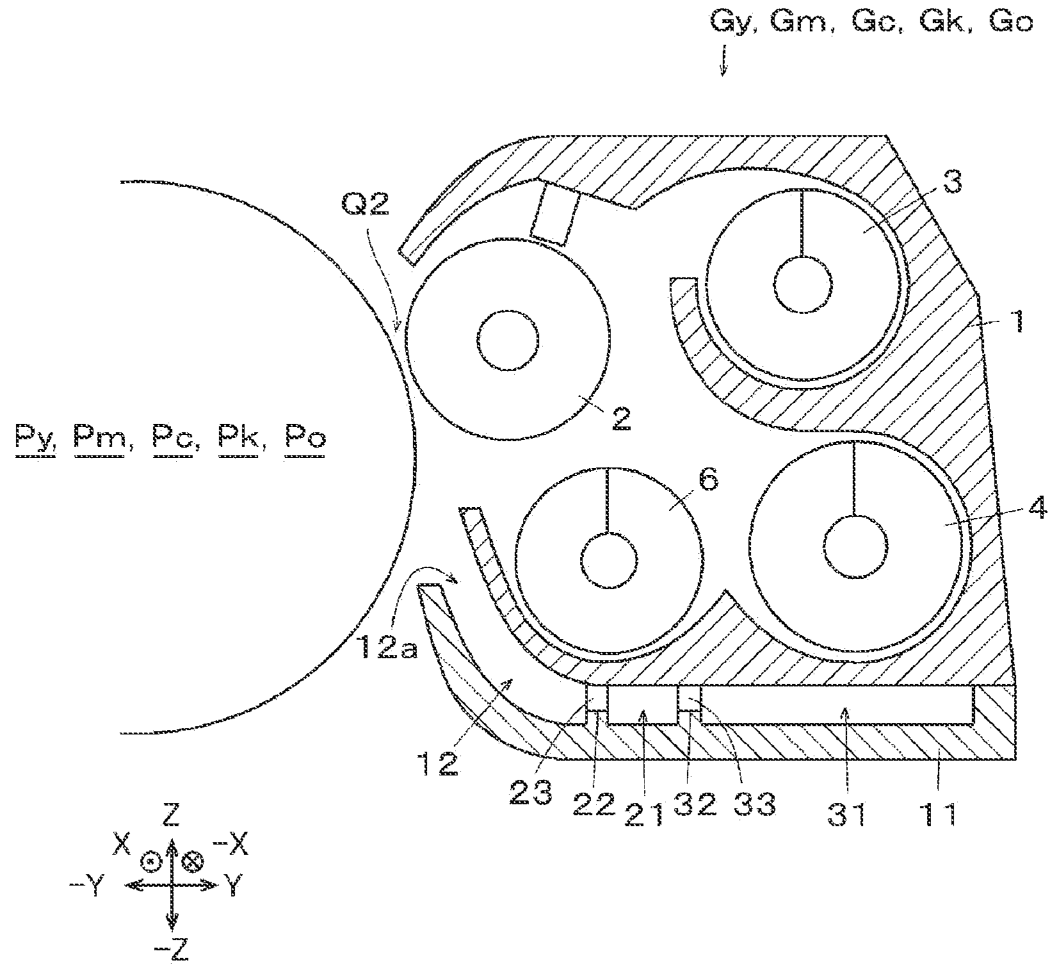
FIG. 2 illustrates a developing device according to the exemplary embodiment.

FIG. 2 illustrates the developing device according to the exemplary embodiment.

Referring to FIG. 2, the developing device Gy according to the exemplary embodiment includes a developer container 1, which is an example of a container. The developer container 1 contains developer, which is an example of powder. A developing roller 2, which is an example of a developer holder, is disposed in the developer container 1. The developing roller 2 is disposed to face the photoconductor Py. The developing roller 2 has a known structure such that the developing roller 2 rotates with the developer being held by magnetic force on the surface thereof, and is capable of supplying the developer to a developing region Q2 in which the developing roller 2 faces the photoconductor Py.

Circulation augers 3 and 4, which are examples of circulation units, are also disposed in the developer container 1. The circulation augers 3 and 4 transport the developer while stirring the developer in the developer container 1, and thereby circulates the developer in the developer container 1. In the exemplary embodiment, the circulation augers 3 and 4 are arranged in the up-down direction. A returning auger 6, which is an example of a returning unit, is disposed between the lower circulation auger 4 and the developing roller 2. The returning auger 6 returns the developer removed from the surface of the developing roller 2 that has passed through the developing region Q2 to the lower circulation auger 4.

Figure 3:
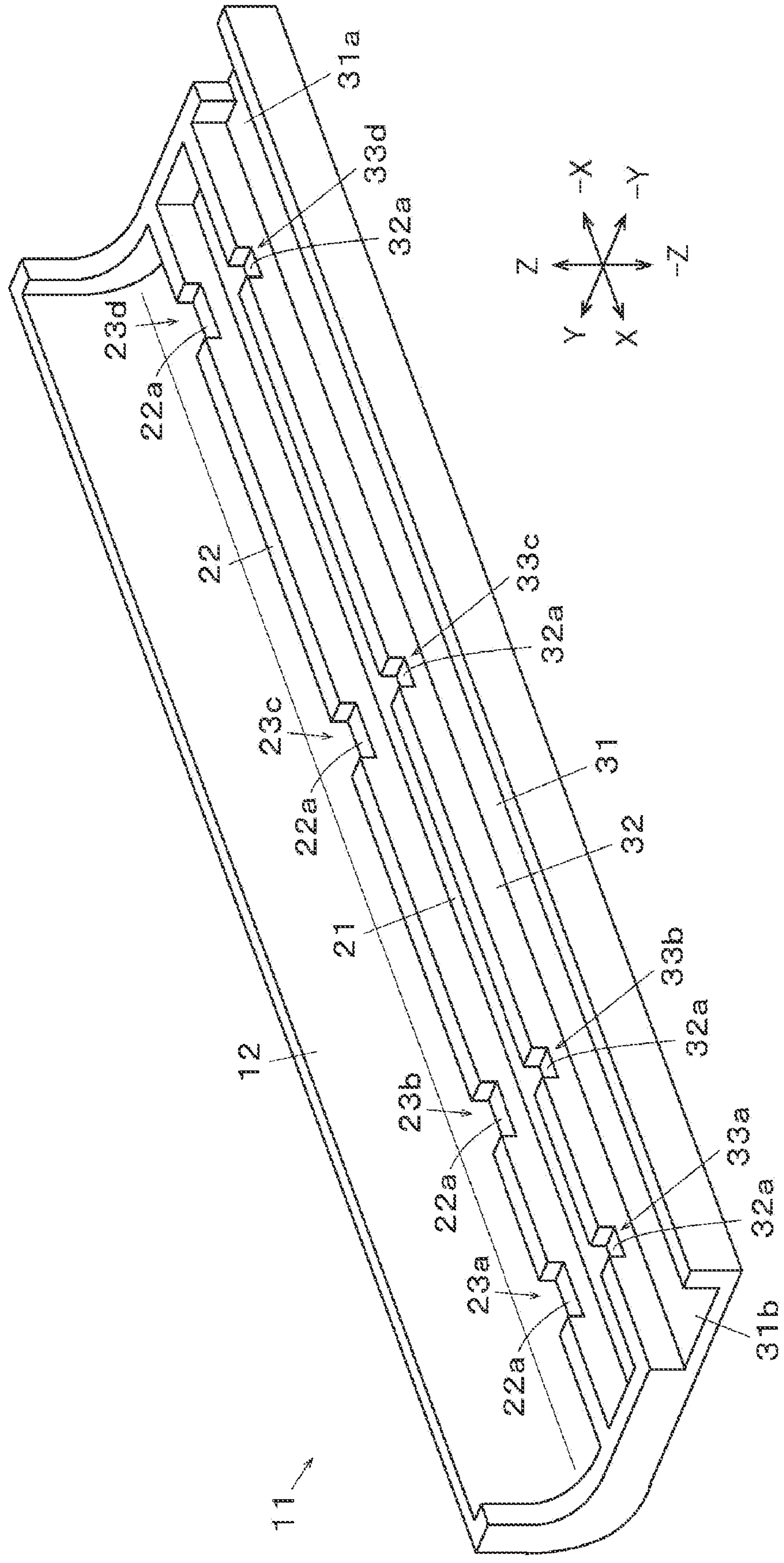
FIG. 3 illustrates a cooling unit according to the exemplary embodiment.

FIG. 3 illustrates a cooling unit according to the exemplary embodiment.

Referring to FIG. 2, a duct 11, which is an example of a collecting unit, is supported at the bottom of the developer container 1. Referring to FIG. 3, an introduction flow passage 12, which is an example of a first passage unit, is formed in a left region of the duct 11. The introduction flow passage 12 is a space through which gas containing the developer that floats in the developing region Q2 passes. The introduction flow passage 12 according to the exemplary embodiment extends along the bottom surface of the developer container 1 in a longitudinal direction (front-back direction, axial direction of the developing roller 2). Referring to FIG. 2, an introduction port 12*a*, which opens toward the photoconductor Py and through which the gas containing the developer is sucked, is formed at the left end of the introduction flow passage 12.

Figure 4:
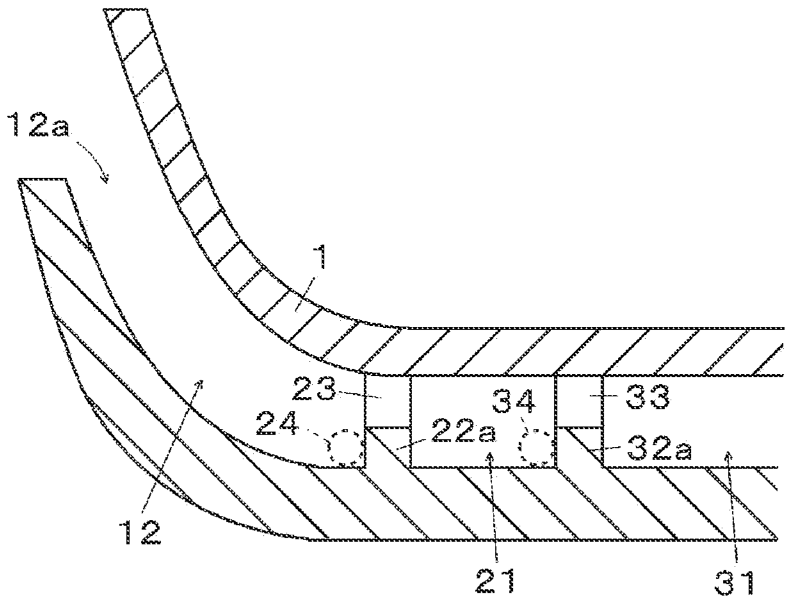
FIG. 4 illustrates a relevant part including an introduction port and suction ports according to the exemplary embodiment.

FIG. 4 illustrates a relevant part including the introduction port and suction ports according to the exemplary embodiment.

Referring to FIGS. 2 and 3, a suction flow passage 21, which is an example of a second passage unit, is formed on the right side of the introduction flow passage 12. The suction flow passage 21 extends in the longitudinal direction along the bottom surface of the developer container 1, and is disposed parallel to the introduction flow passage 12. A first partition wall 22, which is an example of a first partition, is formed between the suction flow passage 21 and the introduction flow passage 12. The first partition wall 22 has suction inlets 23 (23*a*, 23*b*, 23*c*, 23*d*), which are examples of narrowing units and which are also examples of first passage ports, at four positions, which are a front end position, a front position, a central position, and a rear end position. The suction inlets 23*a* to 23*d* according to the exemplary embodiment are formed at the top of the first partition wall 22. Accordingly, low wall portions 22*a* having a height less than the height of other portions in the longitudinal direction are provided below the suction inlets 23*a* to 23*d*. Thus, the cross-sectional area of the suction inlets 23*a* to 23*d* is locally reduced compared to that of the introduction flow passage 12 disposed at an upstream location in a direction in which the gas flows. In addition, a reservoir chamber 24, which is an example of a reservoir unit, is disposed on a side of each low wall portion 22*a* that is adjacent to the introduction flow passage 12, that is, between each of the suction inlets 23*a* to 23*d* and the introduction port 12*a*. The reservoir chambers 24 are capable of receiving some of the developer contained in the gas that flows through the introduction flow passage 12.

Figure 5:
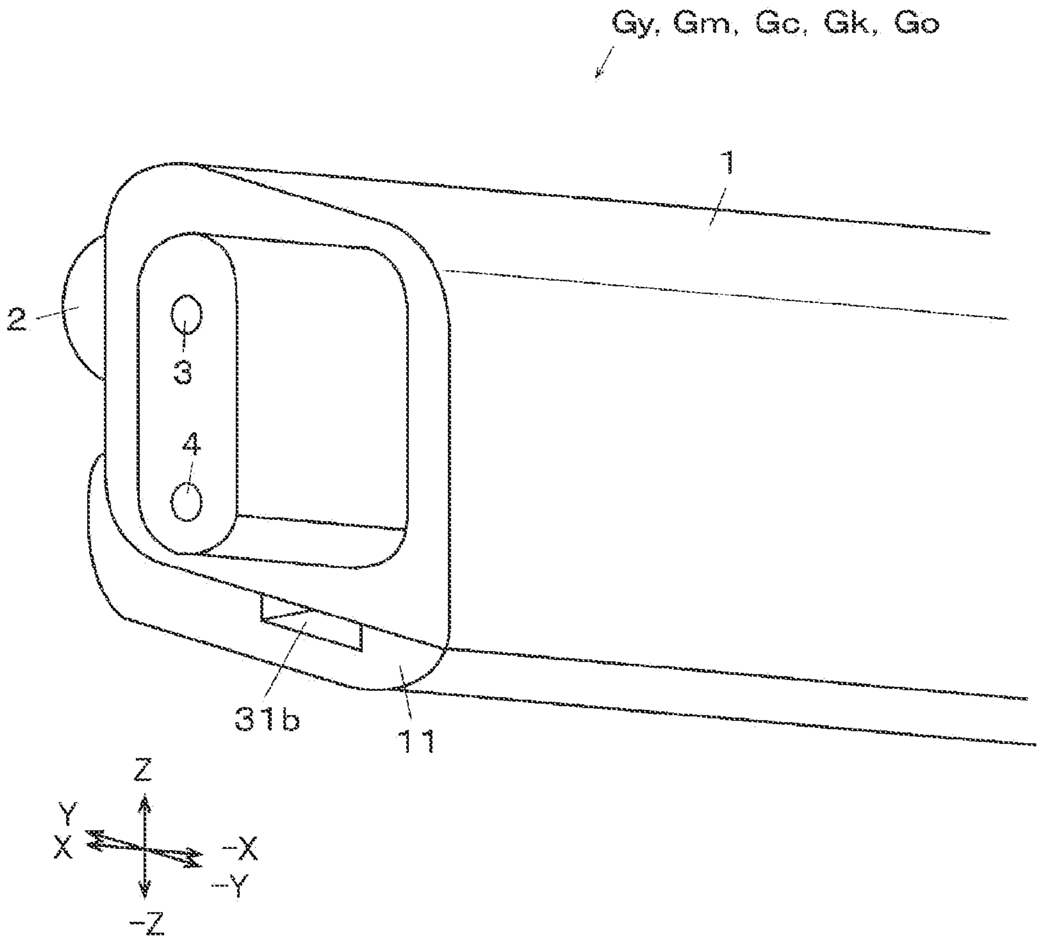
FIG. 5 is an external view of the developing device according to the exemplary embodiment.

FIG. 5 is an external view of the developing device according to the exemplary embodiment.

Referring to FIG. 3, a cooling passage 31, which is an example of a cooling unit, is formed in a right region of the duct 11. The cooling passage 31 extends in the longitudinal direction along the bottom surface of the developer container 1, and is disposed parallel to the suction flow passage 21. The cooling passage 31 has an exhaust portion 31*a* at the rear end thereof. The exhaust portion 31*a* is connected to an exhaust fan (not illustrated), which is an example of an exhaust unit, by a duct (not illustrated), which is an example of a transferring unit. The duct has a filter (not illustrated), which is an example of a removing unit, disposed therein so that the developer contained in the gas is removed.

Referring to FIGS. 3 and 5, the cooling passage 31 has an intake port 31*b* at the front end thereof. The intake port 31*b* is configured to allow introduction of gas from a region in front of the developer container 1 instead of the developing region Q2.

A second partition wall 32, which is an example of a second partition, is formed between the suction flow passage 21 and the cooling passage 31. The second partition wall 32 according to the exemplary embodiment has a structure similar to that of the first partition wall 22. Accordingly, similarly to the suction inlets 23, suction outlets 33 (33*a*, 33*b*, 33*c*, and 33*d*), which are examples of second passage ports and which are also examples of narrowing units, are formed. In addition, the second partition wall 32 also has second low wall portions 32*a* and second reservoir chambers 34, which are similar to the low wall portions 22*a* and the reservoir chambers 24, respectively. In the exemplary embodiment, a cross-sectional area of the suction outlets 33 is less than that of the suction inlets 23.

Operation of Exemplary Embodiment

In each of the developing devices Gy to Go according to the exemplary embodiment having the above-described structure, when an image forming operation is performed, the developer moves between the developing roller 2 and each of the photoconductors Py to Po in the developing region Q2 to develop an image. At this time, some of the developer floats in and around the developing region Q2. The floating developer is sucked through the introduction port 12*a*, caused to flow through the introduction flow passage 12, the suction flow passage 21, and the cooling passage 31, and collected by the filter.

In the image forming apparatus according to the related art described in Patent Document 1, the flow of gas sucked together with the floating developer is used to cool the developing device. In recent years, the productivity of the image forming apparatus, that is, the number of sheets subjected to printing per unit time, has been increased, and the rotational speeds of the photoconductors Py to Po and the corresponding developing rollers 2 have been increased accordingly. In addition, the sizes of the photoconductors Py to Po and the developing rollers 2 have been reduced to reduce the size of the image forming apparatus, and therefore the rotational speeds of the photoconductors Py to Po and the developing rollers 2 need to be increased to maintain the productivity. When the rotational speeds of the photoconductors Py to Po and other components are increased, the amount of the floating developer is also increased, and a greater amount of heat is generated due to high-speed rotation. In addition, as the size of the image forming apparatus is reduced, clearance spaces and gaps are also reduced, and a flow passage used to transport the floating developer and cool the developing device is also reduced in size. Therefore, the amount of gas that is sucked and caused to flow may be insufficient, and this may result in a failure to sufficiently suck the increased amount of floating developer or insufficient cooling flow. Thus, according to the related art, there is a risk that an increase in speed or size reduction will lead to toner clogging or insufficient cooling.

In contrast, in the exemplary embodiment, the cooling passage 31 has the intake port 31*b*, which is not provided in the structure of Patent Document 1, at the front end thereof, and air is introduced into the cooling passage 31 through the intake port 31*b*. Therefore, the overall pressure loss of the duct 11 is less than that in the structure in which air is introduced only through the introduction port 12*a*. When the pressure loss is reduced, the exhaust fan may be easily operated at a high efficiency, and the amount of air introduced through the introduction port 12*a* is also increased compared to when no intake port 31*b* is provided (when only the introduction port 12*a* is provided). As a result, the flow rate of the gas that flows through the cooling passage 31 may be easily increased. In particular, in the exemplary embodiment, instead of hot air near each of the photoconductors Py to Po that are rotated at a high speed and generate heat, air near the intake port 31*b* at the front end is introduced. Accordingly, the introduced gas is cooler than the air near the introduction port 12*a*.

In addition, in the exemplary embodiment, the suction flow passage 21 is formed between the introduction flow passage 12 and the cooling passage 31. Therefore, gas from the suction flow passage 21 and gas from the intake port 31*b* merge in the cooling passage 31. When the suction flow passage 21 is not provided, gas from the introduction flow passage 12 directly enters the cooling passage 31. Therefore, when the number of rotations of the exhaust fan is controlled in accordance with a temperature increase, the amount of gas that enters the cooling passage 31 from the introduction flow passage 12 increases as the amount of gas exhausted by the exhaust fan increases, and decreases as the amount of gas exhausted by the exhaust fan decreases. Accordingly, when the amount of gas that enters from the introduction flow passage 12 increases, an excessive amount of gas containing the developer may be sucked, and clogging by the developer easily occurs.

In contrast, in the exemplary embodiment, the suction inlets 23 and the suction outlets 33 provided between the introduction flow passage 12 and the cooling passage 31 are locally narrowed. In other words, the suction inlets 23 and the suction outlets 33 serve as narrowed portions. Therefore, the pressure loss between the introduction flow passage 12 and the cooling passage 31 is increased, so that changes in the flow rates in the suction flow passage 21 and the introduction flow passage 12 are less than a change in the flow rate in the cooling passage 31. In other words, the sensitivity of the amount of suction into the introduction flow passage 12 to the amount of gas exhausted by the exhaust fan may be reduced. Accordingly, even when the flow rate of the exhaust fan is increased, an increase in the amount of suction through the introduction port 12*a* is not as large as the increase in the flow rate, and the amount of gas introduced through the intake port 31*b* is increased accordingly.

In particular, the opening area of the suction outlets 33 is less than the opening area of the suction inlets 23, so that gas does not easily flow into the cooling passage 31 from the introduction flow passage 12. In addition, the opening area of the suction outlets 33 is less than the cross-sectional area of the cooling passage 31, and the pressure loss is greater for the gas that passes through the suction outlets 33, so that the gas does not easily enter the cooling passage 31.

In addition, in the exemplary embodiment, the suction flow passage 21 extends parallel to the cooling passage 31 in the longitudinal direction. Therefore, the suction flow passage 21 also serves to cool each of the developing devices Gy to Go.

In addition, in the exemplary embodiment, the flow passage of the gas from the introduction flow passage 12 to the cooling passage 31 is locally narrowed at the suction inlets 23 and the suction outlets 33. Therefore, the flow velocity of the gas that passes through the suction inlets 23 and the suction outlets 33 is increased.

In addition, in the exemplary embodiment, a portion of the gas that cannot pass through the suction inlets 23 and the suction outlets 33 forms vortices or accumulates in the reservoir chambers 24 and 34 in regions upstream of the suction inlets 23 and the suction outlets 33. Therefore, the developer contained in the gas easily falls and accumulates in the reservoir chambers 24 and 34. Since some of the floating developer is collected in the reservoir chambers 24 and 34, the amount of developer collected by the filter may be reduced.

Modifications

Although an exemplary embodiment of the present disclosure have been described in detail, the present disclosure is not limited to the above-described exemplary embodiment, and various modifications are possible within the gist of the present disclosure described in the claims. Modifications (H01) to (H07) of the present disclosure will now be described.

(H01) Although the printer U is described as an example of an image forming apparatus in the above-described exemplary embodiment, the image forming apparatus is not limited to this, and may be, for example, a copy machine, a facsimile machine, or a multifunction machine having some or all of the functions of these machines. Also, the image forming apparatus is not limited to an electrophotographic image forming apparatus, and may be any image forming apparatus, such as an inkjet or thermal transfer image forming apparatus.

(H02) Although the printer U uses developers of five colors in the above-described exemplary embodiment, the image forming apparatus is not limited to this, and may be, for example, a monochrome image forming apparatus or a multicolor image forming apparatus that uses four or less or six or more colors.

(H03) Although the endless band-shaped intermediate transfer belt B is described as an example of an image carrier in the above-described exemplary embodiment, the image carrier is not limited to this. The image carrier may be, for example, a cylindrical intermediate transfer drum, a photoconductor, or a photoconductor belt. Also, the intermediate transfer body may be omitted, and an image may be recorded on a recording sheet S directly from a photoconductor.

(H04) Although the suction flow passage 21 may be provided in the above-described exemplary embodiment, the suction flow passage 21 may be omitted, in other words, the introduction flow passage 12 and the cooling passage 31 may be directly connected to each other. In addition, the relationship between the opening area of the suction outlets 33 and the cross-sectional area of the cooling passage 31 may be, but is not limited to, the above-described relationship.

(H05) Although the suction inlets 23 and the suction outlets 33 may be narrowed in the above-described exemplary embodiment, the structure is not limited to this. The dimension of the suction inlets 23 and the suction outlets 33 in the up-down direction may be equal to the height of the first partition wall 22 and the second partition wall 32. Thus, although the reservoir chambers 24 and 34 may be provided, the structure may be such that no reservoir chambers 24 and 34 are provided.

(H06) Although the flow of gas from the introduction flow passage 12 to the cooling passage 31 is regulated based on the relationship between the opening area of the suction inlets 23 and the opening area of the suction outlets 33 in the exemplary embodiment, the structure is not limited to this. For example, the flow of gas from the introduction flow passage 12 to the cooling passage 31 may be suppressed by shifting the positions of the suction inlets 23 and the suction outlets 33 in the longitudinal direction.

(H07) Although the floating developer is sucked and collected from a region downstream of the developing region Q2 in the above-described exemplary embodiment, the structure is not limited to this. The floating developer may be sucked and collected from a region upstream of the developing region Q2.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A developing device including:

a container that contains developer;

a developer holder that rotates with the developer being held on a surface thereof to transport the developer to a developing region; and a cooling unit, wherein an introduction port is provided at a position corresponding to the developing region, the introduction port allowing suction of a floating substance generated in the developing region in a transverse direction of the container, wherein the cooling unit is connected to the introduction port to allow passage of gas containing the floating substance in a longitudinal direction of the container, and cools the container with the gas, and wherein an intake port is connected to an end of the cooling unit in the longitudinal direction, the intake port allowing introduction of gas.

(((2)))

The developing device according to (((1))), further including:

a passage unit that is disposed between the introduction port and the cooling unit and allows passage of gas sucked through the introduction port.

(((3)))

The developing device according to (((2))), wherein the passage unit extends parallel to the cooling unit in the longitudinal direction.

(((4)))

The developing device according to (((2))) or (((3))), wherein a cross-sectional area of a region in which gas passes though the passage unit is less than a cross-sectional area of a region in which gas passes though the cooling unit.

(((5)))

The developing device according to any one of (((1))) to (((4))), further including:

a narrowing unit that is provided between the introduction port and the cooling unit, wherein a cross-sectional area of a region in which gas passes through the narrowing unit is locally small.

(((6)))

The developing device according to (((5))), further including:

a reservoir unit that is disposed between the narrowing unit and the introduction port and that is capable of receiving the floating substance.

(((7)))

An image forming apparatus including:

an image carrier;

a latent-image forming unit that forms a latent image on the image carrier;

the developing device according to any one of (((1))) to (((6))) that develops the latent image on the image carrier;

a transfer unit that transfers an image developed by the developing device to a medium; and a fixing unit that fixes the image transferred to the medium.

What is claimed is:

1. A developing device comprising:

a container that contains developer;

a developer holder that rotates with the developer being held on a surface thereof to transport the developer to a developing region; and a cooling unit, wherein an introduction port is provided at a position corresponding to the developing region, the introduction port allowing suction of a floating substance generated in the developing region in a transverse direction of the container, wherein the cooling unit is connected to the introduction port to allow passage of gas containing the floating substance in a longitudinal direction of the container, and cools the container with the gas, and wherein an intake port is connected to an end of the cooling unit in the longitudinal direction, the intake port allowing introduction of gas.

2. The developing device according to claim 1, further comprising:

a passage unit that is disposed between the introduction port and the cooling unit and allows passage of gas sucked through the introduction port.

3. The developing device according to claim 2, wherein the passage unit extends parallel to the cooling unit in the longitudinal direction.

4. An image forming apparatus comprising:

an image carrier;

a latent-image forming unit that forms a latent image on the image carrier;

the developing device according to claim 3 that develops the latent image on the image carrier;

a transfer unit that transfers an image developed by the developing device to a medium; and a fixing unit that fixes the image transferred to the medium.

5. The developing device according to claim 2, wherein a cross-sectional area of a region in which gas passes though the passage unit is less than a cross-sectional area of a region in which gas passes though the cooling unit.

6. An image forming apparatus comprising:

an image carrier;

a latent-image forming unit that forms a latent image on the image carrier;

the developing device according to claim 5 that develops the latent image on the image carrier;

a transfer unit that transfers an image developed by the developing device to a medium; and a fixing unit that fixes the image transferred to the medium.

7. An image forming apparatus comprising:

an image carrier;

a latent-image forming unit that forms a latent image on the image carrier;

the developing device according to claim 2 that develops the latent image on the image carrier;

a transfer unit that transfers an image developed by the developing device to a medium; and a fixing unit that fixes the image transferred to the medium.

8. The developing device according to claim 1, further comprising:

a narrowing unit that is provided between the introduction port and the cooling unit, wherein a cross-sectional area of a region in which gas passes through the narrowing unit is locally small.

9. The developing device according to claim 8, further comprising:

a reservoir unit that is disposed between the narrowing unit and the introduction port and that is capable of receiving the floating substance.

10. An image forming apparatus comprising:

an image carrier;

a latent-image forming unit that forms a latent image on the image carrier;

the developing device according to claim 9 that develops the latent image on the image carrier;

a transfer unit that transfers an image developed by the developing device to a medium; and a fixing unit that fixes the image transferred to the medium.

11. An image forming apparatus comprising:

an image carrier;

a latent-image forming unit that forms a latent image on the image carrier;

the developing device according to claim 8 that develops the latent image on the image carrier;

a transfer unit that transfers an image developed by the developing device to a medium; and a fixing unit that fixes the image transferred to the medium.

12. An image forming apparatus comprising:

an image carrier;

a latent-image forming unit that forms a latent image on the image carrier;

the developing device according to claim 1 that develops the latent image on the image carrier;

a transfer unit that transfers an image developed by the developing device to a medium; and a fixing unit that fixes the image transferred to the medium.

* * * * *